United States Patent
Bird et al.

(10) Patent No.: US 9,610,954 B2
(45) Date of Patent: Apr. 4, 2017

(54) VEHICLE CONTROL SYSTEM AND METHOD

(71) Applicant: Jaguar Land Rover Limited, Whitley Coventry Warwickshire (GB)

(72) Inventors: Robert Bird, Worc's (GB); Paul Darnell, Royal Leamington Spa (GB)

(73) Assignee: Jaguar Land Rover Limited, Whitley, Coventry, Warwickshire (GB)

( * ) Notice: Subject to any disclaimer, the term of this patent is extended or adjusted under 35 U.S.C. 154(b) by 0 days.

(21) Appl. No.: 14/425,020

(22) PCT Filed: Sep. 6, 2013

(86) PCT No.: PCT/EP2013/068525
§ 371 (c)(1),
(2) Date: Feb. 28, 2015

(87) PCT Pub. No.: WO2014/037541
PCT Pub. Date: Mar. 13, 2014

(65) Prior Publication Data
US 2015/0203119 A1 Jul. 23, 2015

(30) Foreign Application Priority Data

Sep. 6, 2012 (GB) .................................. 1215968.7

(51) Int. Cl.
  *B60W 30/18* (2012.01)
  *B60W 50/08* (2012.01)
  *B60W 10/18* (2012.01)
  *B60W 10/20* (2006.01)

(52) U.S. Cl.
  CPC ...... *B60W 30/18172* (2013.01); *B60W 10/18* (2013.01); *B60W 10/20* (2013.01);
  (Continued)

(58) Field of Classification Search
  CPC ............ B60W 50/082; B60W 50/087; B60W 30/18027; B60W 30/18172;
  (Continued)

(56) References Cited

U.S. PATENT DOCUMENTS

| 2003/0200016 A1* | 10/2003 | Spillane | ................ B60W 10/06 701/36 |
| 2007/0032913 A1* | 2/2007 | Ghoneim | .............. B60W 30/16 701/1 |
| 2010/0161188 A1* | 6/2010 | Turski | .................... B60T 8/175 701/67 |

FOREIGN PATENT DOCUMENTS

| DE | 102005035302 A1 | 2/2007 |
| GB | 2454336 A | 5/2009 |

(Continued)

OTHER PUBLICATIONS

International Search Report for application No. PCT/EP2013/068525, dated Jan. 14, 2014, 6 pages.
UK Combined Search and Examination Report for corresponding application No. 12159681, dated Apr. 23, 2013, 6 pages.
(Continued)

*Primary Examiner* — Yuen Wong
(74) *Attorney, Agent, or Firm* — Reising Ethington P.C.

(57) ABSTRACT

Embodiments of the present invention provide a vehicle control system for at least one vehicle subsystem of a vehicle, the system being operable to activate a vehicle launch assist (VLA) function to prevent excessive wheel slip, when the launch assist function is active the system being configured to impose a set of one or more prescribed constraints on an amount of torque applied to one or more wheels of a vehicle, wherein the set of one or more constraints ere determined by reference to information or data in respect of an amount of wheel torque that may be applied before the amount of wheel slip exceeds a prescribed value.

21 Claims, 5 Drawing Sheets

(52) U.S. Cl.
CPC .... B60W 30/18027 (2013.01); B60W 50/082 (2013.01); B60W 50/087 (2013.01); *B60W 2520/26* (2013.01); *B60W 2540/04* (2013.01); *B60W 2540/10* (2013.01); *B60W 2550/141* (2013.01); *B60W 2550/148* (2013.01); *B60W 2720/26* (2013.01); *B60W 2720/30* (2013.01)

(58) Field of Classification Search
CPC ......... B60W 2520/26; B60W 2540/04; B60W 10/20; B60W 2550/141; B60W 2550/148; B60W 2720/26; B60W 2720/30; B60W 10/18; B60W 2540/10
See application file for complete search history.

(56) References Cited

FOREIGN PATENT DOCUMENTS

| | | |
|---|---|---|
| JP | S63234161 A | 9/1988 |
| JP | H06280633 A | 10/1994 |
| JP | 2008018874 A | 1/2008 |

OTHER PUBLICATIONS

Written Opinion for application No. PCT/EP2013/068525, dated Jan. 14, 2014, 7 pages.

Japanese Notice of Reasons for Rejection in Japanese with English summary, corresponding with Japanese application No. 2015-530426, dated Mar. 22, 2016, 5 pages.

* cited by examiner

FIGURE 3

| SP = Speed Proportional<br>TM = Towing Mode | | Motorway | Country Road | City Driving | Towing (on Road) | Dirt Track (Developing World Road) | Snow / Ice (Scandinavian / North America Conditions) | Grass/ gravel/ snow | Sand | Rock/ Crawl/ Boulder Crossing | Mud & ruts |
|---|---|---|---|---|---|---|---|---|---|---|---|
| Suspension Ride Height | High | | | | | | | | | X | |
| | Standard | | X | X | X | X | X | X | X | | X |
| | Low | X | | | | | | | | | |
| Side / Side Air Interconnection | Closed | X | X | X | X | | | | | | |
| | Open | | | | | X | X | X | X | X | X |
| Steering Assistance Level | High | SP | SP | SP | SP | SP | SP | SP | SP | | SP |
| | Low | | | | | | | | | X | |
| Brake Pedal Efforts | High | X | X | X | X | X | X | X | X | X | X |
| | Low | | (X) | X | | | | | | | |
| A.B.S. Mode | High mu | X | X | X | X | | | | | X | |
| | Low mu | | | | | X | X | X | X | | X |
| | Plough Surface | | | | | | | | | | |
| E.T.C. Mode | High mu | X (2) | X | X | X | | | | | | |
| | Low mu | | | | | X | X | X | X | X | X |
| D.S.C. Mode | High mu | X | X | X | TM | | | | | | |
| | Low mu | | | | | X | X | X | X | X | X |
| Throttle Progression | Quick | | (X) | | (X) | | | | | | |
| | Slow | X | X | X | X | X | X | X | X | X | X |
| Transfer Box | High Range | X | X | X | X | X | X | X | X | X | X |
| | Low Range | | | | | | | | | | |
| Auto Transmission | Normal Mode | X | | X | X | X | X | X | X | X | |
| | Performance Mode | | X | | | | | | | | |
| | Snow Mode | | | | | | | X | | | X |
| | Sand Mode | | | | | | | | X | | |
| | Manual Mode | | (X) | | | | | | | | X |
| Central Diff Lock | Open | X | X | X | X | X | X | X | X | | X |
| | Locked | | | | | | | | | X | |
| Rear Diff Lock | Open | X | X | X | X | X | X | X | (X) | X | X |
| | Locked | | | | | | | | | X | |

VEHICLE CONTROL SYSTEM AND METHOD

INCORPORATION BY REFERENCE

The content of co-pending UK patent application numbers GB1111288.5, GB1211910.3 and GB1202427.9 are incorporated herein by reference.

FIELD OF THE INVENTION

The present invention relates to a vehicle control system for one or more vehicle subsystems and to a method of controlling one or more vehicle subsystems.

BACKGROUND

It is known to provide a vehicle having a plurality of subsystems which can be operated in different configurations to suit different driving conditions. For example, automatic transmissions may be controlled in a variety of modes such as sport, manual, winter or economy. In each mode, subsystem control parameters such as accelerator pedal response and conditions under which changes between gear ratios take place may be modified so as to suit the conditions of the terrain or the particular taste of the driver. It is also known to provide air suspensions with en-road and off-road modes. Stability control systems can be operated at reduced activity in certain modes so as to give the driver more direct control, and power steering systems can be operated in different modes to provide a varying level of assistance depending on driving conditions.

It is desirable to provide an improved control system for a motor vehicle operable in different configurations.

SUMMARY OF THE INVENTION

Embodiments of the invention may be understood with reference to the appended claims.

Aspects of the present invention provide a control system, a vehicle and a method.

Control systems according to embodiments of the present invention are suitable for a range of different vehicles including conventional engine-only vehicles, electric vehicles, and/or hybrid electric vehicles.

In one aspect of the invention for which protection is sought there is provided a vehicle control system for at least one vehicle subsystem of a vehicle, the system being operable to activate a vehicle launch assist (VLA) function to prevent excessive wheel slip, when the launch assist function is active the system being configured to impose a set of one or more prescribed constraints on an amount of torque applied to one or more wheels of a vehicle, wherein the set of one or more constraints are determined by reference to information or data in respect of an amount of wheel torque that may be applied before the amount of wheel slip exceeds a prescribed value.

The system may be arranged to impose the set of one or more constraints to prevent wheel slip exceeding the prescribed value.

Optionally, the information or data in respect of an amount of wheel torque that may be applied before the amount of wheel slip exceeds the prescribed value comprises information or data pertaining to a capacity of terrain in contact with a tyre to provide traction to a vehicle.

Optionally, the first set of one or more constraints include at least one constraint on the operation of a powertrain of the vehicle.

Optionally, the first set of one or more constraints include at least one selected from amongst a reduction in a rate of response of a powertrain to an increase in driver demanded torque, a reduction in a maximum allowable rate of increase of powertrain torque and a reduction in a maximum allowable value of powertrain torque.

Each of these features may be effected by varying in real time a value of maximum allowable powertrain toque. The maximum allowable toque may be arranged to increase at a rate not exceeding the maximum allowable rate under a given set of conditions, for example, constraining the actual powertrain torque developed in a corresponding manner.

Optionally, the system may comprise a subsystem controller for initiating control of a plurality of vehicle subsystems in a selected one of a plurality of subsystem control modes, each of which corresponds to one or mere different driving conditions for a vehicle, the system being configured to allow the VLA function to be activated only when the condition is met that at least one of a first set of one or more subsystem control modes is selected.

The system may be configured to prevent the VLA function from being activated if a second prescribed control mode is selected not being a member of the first set.

The control modes may also be referred to as operating modes.

Optionally, the first set of one or more subsystem control modes includes a sand mod(c) in which the subsystems are controlled in a manner suitable for driving on sand.

Optionally, at least one of the subsystems is arranged, in the sand mode, to allow only relatively low levels of wheel spin when a vehicle is traveling at low speeds so as to avoid vehicle wheels becoming submerged in sand, but to allow relatively high levels of wheel spin when a vehicle is traveling at higher speeds.

Optionally, in the sand mode, a powertrain is arranged to provide relatively low levels of drive torque for a given accelerator or throttle control position allow vehicle speeds and to provide relatively high levels of drive torque for a given accelerator or throttle control position at higher vehicle speeds.

The system may be operable in a manual operating mode selection condition in which a user may select a required system control mode by means of user-operable mode selection input means.

The system may be operable in an automatic mode selection condition in which the system is configured to select automatically an appropriate system operating mode.

The system may be configured to impose the first set of one or more prescribed constraints only when the system is operating in the manual mode selection condition.

Optionally, the system may be configured to allow the VLA function to be activated only when the system in operating in the manual mode selection condition.

Optionally, the information or data in respect of the amount of wheel torque that may be applied is determined at least in part according to the selected control mode.

Optionally, the information or data in respect of the amount of wheel torque that may be applied before the amount of wheel slip exceeds the prescribed value is determined at least in part according to information or data in respect of at least one selected from amongst a type of terrain on which a vehicle is supported, a deformability of a surface on which a vehicle is supported, a size of an area of contact between a surface and one or more wheels of a vehicle, a coefficient of surface friction between one or more wheels and a surface, tyre pressure, suspension travel, suspension articulation, gradient, status of a locking differential selected gear and selected power transfer unit gear ratio.

Optionally, the prescribed value of wheel slip is determined in dependence on one or more vehicle operating parameters.

Optionally, the one or more operating parameters are selected from amongst vehicle speed, wheel speed and a type of terrain over which a vehicle is moving.

Optionally, the type of terrain is determined at least in part in dependence on the selected control mode.

Optionally, the prescribed set of one or more conditions in response to which the VLA system is activated include at least one selected from amongst: vehicle speed is less than a prescribed value, driver demanded torque is greater than a prescribed value, accelerator pedal position is beyond a prescribed amount of travel, a selected transmission gear is a prescribed one or more gears and a selected power transfer unit gear ratio is a prescribed ratio.

The control modes may be control modes of at least two vehicle subsystems selected from amongst a powertrain, a transmission system, a steering system, a brakes system and a suspension system.

The control modes may be control modes of each of these subsystems.

For example, in the case of a vehicle sub-system in the form of a suspension system operable at a plurality of different ride-heights for a given vehicle loading, the subsystem configuration modes may include modes corresponding to different respective ride heights. In the case of a vehicle sub-system controller in the form of an engine or powertrain controller, the controller may be configured to provide different respective values of engine torque as a function of accelerator pedal position in each of a plurality of different powertrain controller configuration modes. A subsystem control mode may therefore correspond to a set of subsystem configuration modes, for example one configuration mode for each subsystem. For example in one operating mode a 'high' ride height subsystem configuration mode may be set for the suspension system and a 'slow' accelerator pedal map subsystem configuration mode may be set for the powertrain controller. Some subsystems may allow two different parameters to be set. Thus the suspension system may allow a roll stiffness setting of the suspension to be set to one of a plurality of configuration modes such as low, medium or high.

Various possible known subsystem configuration modes will now be described. The reader is referred to US2003/0200018 for further details in respect of known types of subsystem configuration mode and the manner in which the configuration modes may be implemented. Other configuration modes are also useful. Other subsystems may also be controlled, in addition or instead.

Optionally, the operating modes include control modes of a suspension system and the plurality of subsystem configuration modes comprise a plurality of ride heights.

The suspension system may be a fluid suspension system. The fluid employed by the suspension system may by a gas such as air. The fluid may be a liquid in some alternative embodiments.

In some embodiments the system may choose one amongst a 'low' ride height, a 'standard' ride height that is higher than the low ride height, a 'high' ride height that is higher than the standard ride height and a 'maximum' ride height that is higher than the high ride height.

Optionally, the operating modes include control modes of a fluid suspension system in which fluid interconnection can be made between suspensions for wheels on opposite sides of a vehicle, and wherein said plurality of subsystem configuration modes provide different levels of said interconnection.

Optionally, the operating modes include control modes of a steering system which can provide steering assistance, and wherein said plurality of subsystem configuration modes provide different levels of said steering assistance.

Optionally, the operating modes include control modes of a brakes system which can provide braking assistance, and said plurality of subsystem configuration modes provide different levels of said braking assistance.

Optionally, the operating modes include control modes of a brake control system which can provide an anti-lock function to control wheel slip, and said plurality of subsystem configuration modes allow different levels of said wheel slip.

Optionally, the operating modes include control modes of a traction control system which is arranged to control wheel spin, and said plurality of subsystem configuration modes allow different levels of said wheel spin.

Optionally, the operating modes include control modes of a yaw control system which is arranged to control vehicle yaw, and said plurality of subsystem configuration modes allow different levels of divergence of said vehicle yaw from an expected yaw.

Optionally, the operating modes include control modes of a range change transmission and said subsystem configuration modes may include a high range mode and a low range mode of said transmission.

The range change transmission may for example be comprised by a power transfer unit or power take-off unit for coupling a prop shaft, of a driveline to a torque transmission path from an engine or transmission of a vehicle, such as an automatic transmission.

Optionally, the operating modes include control modes of a powertrain which includes a powertrain control means (such as an electronic controller) and an accelerator or throttle pedal, the subsystem configuration modes providing different levels of responsiveness of the powertrain control means to movement of the accelerator or throttle pedal.

Optionally, the operating modes include control modes of a transmission system operable in a plurality of transmission ratios and including a transmission control means (such as an electronic transmission controller) arranged to monitor at least one parameter of the vehicle and to select the transmission ratios in response, and wherein the subsystem configuration modes include a plurality of transmission configuration modes in which the transmission ratios are selected differently in response to said at least one parameter.

One of the subsystems may comprise a differential system configured to provide a plurality of levels of differential lock, and the subsystem configuration modes may be arranged to provide different levels of said lock.

The differential system may be arranged to control the level of differential lock on the basis of a plurality of inputs, and to respond differently to said inputs in each of the modes.

The differential system may comprise a centre differential, a front differential, and/or a rear differential. At least one differential may be a clutch-based system in some embodiments, whereby differences in rates of rotation of wheels are accommodated by slipping of a clutch rather than by means of a conventional differential gear arrangement in which side wheels are coupled via pinion wheels supported by a differential cage in order to allow relative rotation.

One of the subsystems may comprise a roll control system arranged to provide roll correction to reduce vehicle roll and the subsystem configuration modes provide different levels of roll correction of the vehicle, at least under some driving conditions.

One of the subsystems may comprise a speed control system. The speed control system may be configured to control the speed of the vehicle when descending a hill. The speed control system may be arranged to control the vehicle to different speeds in the different configuration modes.

Alternatively or in addition the speed control system may comprise an off-road cruise control system.

Optionally, the operating modes may include an off-road mode in which the subsystems are controlled in a manner suitable for driving on rough terrain and an on-road mode in which the subsystems are controlled in a manner suitable for driving on-road.

Optionally the suspension system is arranged to provide a higher ride height in the off road mode than in the on-road mode.

Further optionally, in the off-road mode a higher level of said interconnection is provided than in the on-road mode.

The traction control system may be arranged to allow less wheel spin in the off-road mode than in the on-road mode.

Optionally the yaw control system is arranged to allow a higher degree of said divergence in the off-road mode than in the on-road mode.

Optionally, in the off-road mode the range change transmission is operated in the low range.

Optionally, in the off-road mode the powertrain control means is arranged to provide lower levels of drive torque, for a given accelerator or throttle pedal position, at least at low levels of accelerator pedal depression, than in the on-road mode.

Optionally, the differential system is arranged to provide higher levels of differential look in the off-road mode than in the on-road mode.

Optionally, the roll control system is arranged to provide a higher roll stiffness in the on-road mode than in the off-road mode.

Optionally, the speed control system is arranged to be switched on in the off-road mode and switched off in the on-road mode.

Optionally, the driving modes include at least one low friction mode in which the subsystems are controlled in a manner suitable for driving on low friction surfaces and a high friction mode in which the subsystems are controlled in a manner suitable for driving on high friction surfaces.

Optionally, the brake control system allows higher levels of slip in the high friction mode than in the low friction mode.

Optionally, the traction control system allows higher levels of wheel spin in the high friction mode than in the low friction mode.

Optionally, the braking control system provides a greater level of braking assistance in the high friction mode than in the low friction mode.

Optionally, the powertrain control means is arranged to provide lower levels of drive torque, for a given accelerator or throttle pedal position, at least at low levels of accelerator pedal depression, in the low friction mode than in the high friction mode.

Optionally, the transmission system is arranged to operate in higher gears for a given value of said at least one parameter in the high friction mode than in the low friction mode.

Optionally, the differential system is arranged to provide higher levels of differential lock in the low friction mode than in the high friction mode.

Optionally, the high friction mode may comprise a standard or default mode in which the vehicle will operate normally and which is suitable for on-road driving.

Optionally, there are at least two such low friction modes and the suspension system is arranged to provide a higher ride height in one of the low friction modes than in the other.

Further optionally, there are at least two such low friction modes and the suspension system is arranged to provide a higher level of said cross linking in one of the low friction modes than in the other.

Optionally, the at least two low friction modes may comprise a mud mode suitable for traveling through deep mud, and another low friction mode suitable for driving in snow, on grass, or on gravel.

Optionally there may be a plurality of low friction modes, one of which may be a grass mode in which the subsystems are controlled in a manner suitable for driving on grass, one of which may be an ice mode in which the subsystems are controlled in a manner suitable for driving in ice, and one of which may be a mud mode in which the subsystems are controlled in a manner suitable for driving on mud.

Optionally one of the modes is a sand mode in which the subsystems are controlled in a manner suitable for driving on sand. At least one of the subsystems may be arranged, in the sand mode, to allow only relatively low levels of wheel spin when the vehicle is traveling at low speeds so as to avoid the vehicle wheels becoming submerged in sand, but to allow relatively high levels of wheel spin when the vehicle is traveling at higher speeds. Optionally, in the sand mode, the powertrain control system is arranged to provide relatively low levels of drive torque for a given throttle pedal position at low vehicle speeds and to provide relatively high levels of drive torque for a given throttle pedal position at higher vehicle speeds.

The off-road mode may be a rock crawl mode in which the subsystems are controlled in a manner suitable for driving over rocks. Alternatively it may be set up for more general off-road use. One or more other off-road modes may be provided in addition or instead.

One of the modes may be a rough-road mode in which the subsystems are controlled in a manner suitable for driving on rough roads, for example for driving at relatively high speeds over rough surfaces.

At least one of the modes may be a plough surface mode in which the brake control subsystem is arranged to allow a relatively high degree of wheel slip under braking. This may be useful, for example on snow or sand, where the build-up of matter in front of the wheels under braking can improve braking performance.

Optionally, at least one of the modes is an on-road mode in which the subsystems are controlled in a manner suitable for driving on-road. For example, one of the modes may be a motorway mode in which the subsystems are controlled in a manner suitable for driving at high speed on a flat road surface. One of the modes may be a country road mode in which the subsystems are controlled in a manner suitable for driving on country roads.

The driving modes may be selectable by means of at least two inputs, one of which may be a terrain selection input arranged to influence the mode selected on the basis of the terrain selected, and the other of which may be a mode of use input arranged to influence the mode selected on the basis of a selected mode of use of the vehicle. Each of these inputs may be user-controlled inputs, or may be derived from one or more sensors.

The mode of use input may be arranged to allow selection between a plurality of driving styles, which may include, for example, a normal style, a sport style, and an economy style.

Alternatively, or in addition, the mode of use input may be arranged to allow selection between a plurality of states of the vehicle, for example including a towing state or a loaded state.

The control system may be configured to activate the VLA function in dependence on a signal indicating a status of a slip control system.

It is to be understood that the slip control system is a system operable to reduce slip independently of the VLA function.

The system may be configured to prevent the VLA function from becoming active and attempting to prevent excessive wheel slip if the signal indicates the slip control system is in a state in which the slip control system is able to intervene to reduce slip.

Thus, the VLA function may be prevented from taking action, for example imposing the one or more constraints, if the slip control system is able to intervene to reduce slip.

It is to be understood that the slip control system may be in a state in which it not able to intervene to reduce slip if vehicle speed is below a threshold speed, the threshold speed being a speed below which the slip control system is not permitted to take action to reduce slip due to a vehicle speed signal being unavailable or unreliable, for example a speed of around 5 kph.

The slip control system may be or comprise a stability control system and/or a traction control system.

In a further aspect of the invention for which protection is sought there is provided a method of controlling at least one vehicle subsystem implemented by means of computing means, the method comprising:

activating a launch assist function to prevent excessive wheel slip, the step of activating the launch assist function comprising the step of imposing a first set of one or more prescribed constraints on an amount of torque applied to one or more wheels of a vehicle to prevent wheel slip exceeding a prescribed value, the method comprising determining the first set of one or more constraints by reference to information or data in respect of an amount of wheel torque that may be applied before the amount of wheel slip exceeds a prescribed value.

Optionally, determining the first set of one or more constraints by reference to information or data in respect of an amount of wheel torque comprises determining the first set of one or more constraints by reference to information or data pertaining to a capacity of terrain in contact with a tyre to provide traction to a vehicle.

Optionally, imposing a first set of one or more prescribed constraints on an amount of torque applied to one or more wheels of a vehicle comprises imposing at least one constraint on the operation of a powertrain of the vehicle.

Optionally, the first set of one or more constraints include at least one selected from amongst a reduction in a rate of response of a powertrain to an increase in driver demanded torque, a reduction in a maximum allowable rate of increase of powertrain torque and a reduction in a maximum allowable value of powertrain torque.

In a still further aspect of the invention for which protection is sought there is provided a carrier medium carrying computer readable code for controlling a vehicle to carry out a method according to an aspect of the invention.

In one aspect of the invention for which protection is sought there is provided a vehicle control system for at least one vehicle subsystem of a vehicle, the system being operable to activate a vehicle launch assist (VLA) function to prevent excessive wheel slip, when the launch assist function is active the system being configured to impose a set of one or mom prescribed constraints on an amount of torque applied to one or more wheels of a vehicle to prevent wheel slip exceeding a prescribed value.

wherein the set of one or more constraints are determined by reference to information or data pertaining to a capacity of terrain in contact with a tyre to provide fraction to a vehicle.

In one aspect of the invention for which protection is sought there is provided a vehicle control system for at least one vehicle subsystem of a vehicle, the system being operable to activate a vehicle launch assist (VLA) function to prevent excessive wheel slip when a prescribed set of one or more conditions are met, when the launch assist function is active the system being configured to impose a first set of one or more prescribed constraints on the operation of one or more of the vehicle subsystems, wherein the first set of one or more constraints are determined by reference to data in respect of an amount of wheel torque that may be applied before the amount of wheel slip exceeds a prescribed value.

Embodiments of the invention have the advantage that the VLA function may be optimised for a given surface on which the vehicle is supported. Thus, the imposition of unnecessarily harsh constraints on vehicle subsystem operation may be avoided when on certain surfaces.

For example, in some embodiments if the vehicle is supported on relatively deep, soft sand, the first set of one or more constraints may be more harsh than in the case that the vehicle is supported on dry grass. This is because the amount of wheel torque that may be applied before excessive slip occurs when on dry grass may be greater than that in the case of soft sand. It is to be understood that in some embodiments the maximum allowable value of wheel slip may be dependent on the type of surface on which the vehicle is supported.

The first set of one or more constraints may include one or more constraints in respect of powertrain torque development. The constraints may be constraints in respect of powertrain torque development in response to driver demand, optionally in response to a given amount of actuation of an accelerator/throttle control, such as a given amount of accelerator/throttle pedal actuation.

Advantageously the first set of one or more constraints may include at least one selected from amongst a reduction in a rate of response of the powertrain to an increase in driver demanded torque or accelerator/throttle control position such as a pedal position, a reduction in a maximum allowable rate of increase of powertrain torque and a reduction in a maximum allowable value of powertrain torque.

It is to be understood that in some embodiments no deliberate limit may be imposed by the system in respect of powertrain rate of response, maximum rate of increase or maximum powertrain torque. That is, any such limit is due only to inherent limitations of one or mere components, such as inertia of an internal combustion engine and the like. Thus, reference to a 'reduction in' a given characteristic may be understood in such embodiments to refer to a reduction relative to a given inherent system limitation.

The first set of one or more constraints may be determined according to one or more selected from amongst a type of terrain on which the vehicle is supported, a deformability of a surface on which the vehicle is supported, a size of an area of contact between the surface and one or more wheels of the vehicle and a coefficient of surface friction between one or more wheels and the surface.

The type of terrain may be determined by reference to one or more terrain indicators, optionally in addition or instead a signal received from one or more sensors and/or derived from one or more sensors. The one or more terrain indicators may themselves be generated in response to data obtained from one or more sensor outputs end/or derived from one or more sensor outputs.

Optionally the data in respect of the amount of wheel torque that may be applied is determined according to data in respect of at least one selected from amongst tyre pressure, suspension travel, suspension articulation, gradient, status of a locking differential, selected gear and selected power transfer unit gear ratio.

The prescribed value of wheel slip may be determined in dependence on one or more vehicle operating parameters.

Optionally the one or more operating parameters are selected from amongst vehicle speed, wheel speed and a type of terrain over which the vehicle is moving.

The prescribed set of one or more conditions in response to which the VLA system is activated may include at least one selected from amongst; vehicle speed is less than a prescribed value, driver demanded torque is greater than a prescribed value, accelerator pedal position is beyond a prescribed amount of travel, a selected transmission gear is a prescribed one or more gears and a selected power transfer unit gear ratio is a prescribed ratio.

Advantageously the system may comprise a subsystem controller for initiating control of the or each of the vehicle subsystems in a selected one of a plurality of subsystem control modes, each of which corresponds to one or more different driving conditions for the vehicle, the system being configured to allow a user to select a required subsystem control mode.

The system may be configured to allow the VLA function to be activated or to allow the VLA function to impose one or more constraints only when the condition is met that a prescribed subsystem control mode is selected by the user.

The prescribed subsystem control mode may be a mode corresponding to motion of the vehicle over sand.

In one aspect of the invention there is provided a vehicle comprising a system according to the preceding aspect.

In an aspect of the invention for which protection is sought there is provided a method of controlling at least one vehicle subsystem implemented by means of computing means, the method comprising: activating a launch assist function to prevent excessive wheel slip when a prescribed set of one or more conditions are met, the step of activating the launch assist function comprising the step of imposing a first set of one or more prescribed constraints on the operation of one or more of the vehicle subsystems, wherein the first set of one or more constraints are determined by reference to data in respect of an amount of wheel torque that may be applied before the amount of wheel slip exceeds a prescribed value.

Within the scope of this application it is expressly envisaged that the various aspects, embodiments, examples and alternatives set out in the preceding paragraphs, in the claims and/or in the following description and drawings, and in particular the individual features thereof, may be taken independently or in any combination. Features described in connection with one embodiment are applicable to all embodiments, unless such features are incompatible.

For the avoidance of doubt, it is to be understood that features described with respect to one aspect of the invention may be included within any other aspect of the invention, alone or in appropriate combination with one or more other features.

BRIEF DESCRIPTION

One or more embodiments of the invention will now be described, by way of example only, with reference to the accompanying figures in which:

FIG. 3 is a table showing which vehicle subsystem configuration made is selected in each respective vehicle operating mode;

DETAILED DESCRIPTION

Figure 1:
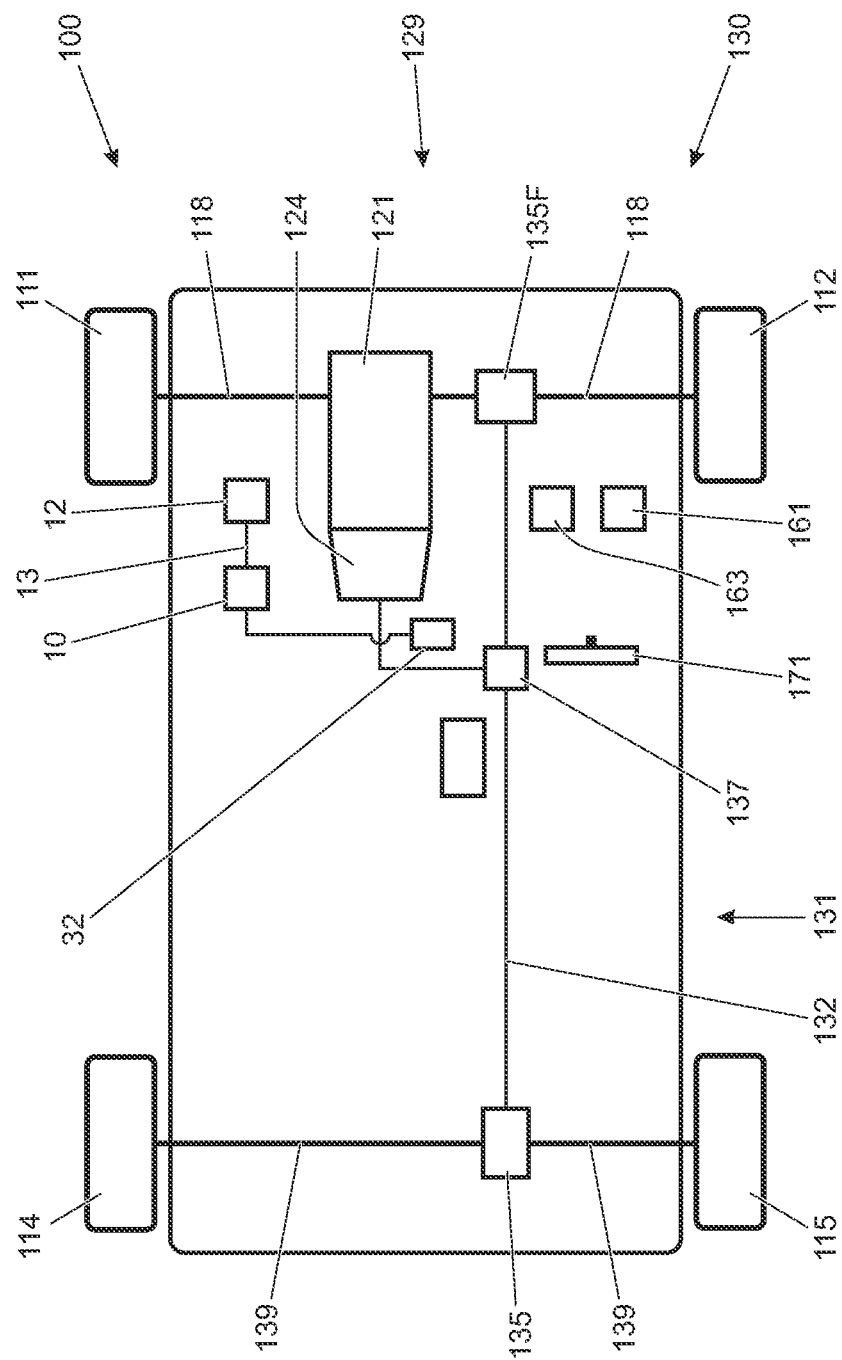
FIG. 1 is a schematic illustration of a vehicle according to an embodiment of the present invention.

FIG. 1 shows a vehicle 100 according to an embodiment of the invention intended to be suitable for off-road use, that is for use on terrains other than regular tarmac road. The vehicle 100 has a powertrain 129 that includes an engine 121 that is connected to a driveline 130 having a transmission 124. In the embodiment shown the transmission 124 is an automatic transmission 124. Embodiments of the present invention are also suitable for use in vehicles with a manual transmission, continuously variable transmission or any other suitable transmission.

The driving 130 is arranged to drive a pair of front vehicle wheels 111,112 by means of a front differential 135F and a pair of front drive shafts 118. The driveline 130 also comprises an auxiliary driveline portion 131 arranged to drive a pair of rear wheels 114, 115 by means of an auxiliary driveshaft or prop-shaft 132, a rear differential 135 and a pair of rear driveshafts 139. Embodiments of the invention are suitable for use with vehicles in which the transmission is arranged to drive only a pair of front wheels or only a pair of rear wheels (i.e. front wheel drive vehicles or rear wheel drive vehicles) or selectable two wheel drive/four wheel drive vehicles. In the embodiment of FIG. 1 the transmission 124 is releasably connectable to the auxiliary driveline portion 131 by means of a power transfer unit (PTU) 137, allowing selectable two wheel drive or four wheel drive operation. It is to be understood that embodiments of the invention may be suitable for vehicles having more than four wheels or where only two wheels are driven, for example two wheels of a three wheeled vehicle or four wheeled vehicle or a vehicle with more than four wheels.

The PTU 137 is operable in a 'high ratio' or a 'low ratio' configuration, in which a gear ratio between an input shaft and an output shaft thereof is selected to be a high or low ratio. The high ratio configuration is suitable for general on-road or 'on-highway' operations whilst the low ratio configuration is more suitable for negotiating certain off-road terrain conditions.

The vehicle 100 has a central controller, referred to as a vehicle control unit (VCU) 10. The VCU 10 receives and outputs a plurality of signals to and from various sensors and subsystems 12 provided on the vehicle 100.

Figure 2:
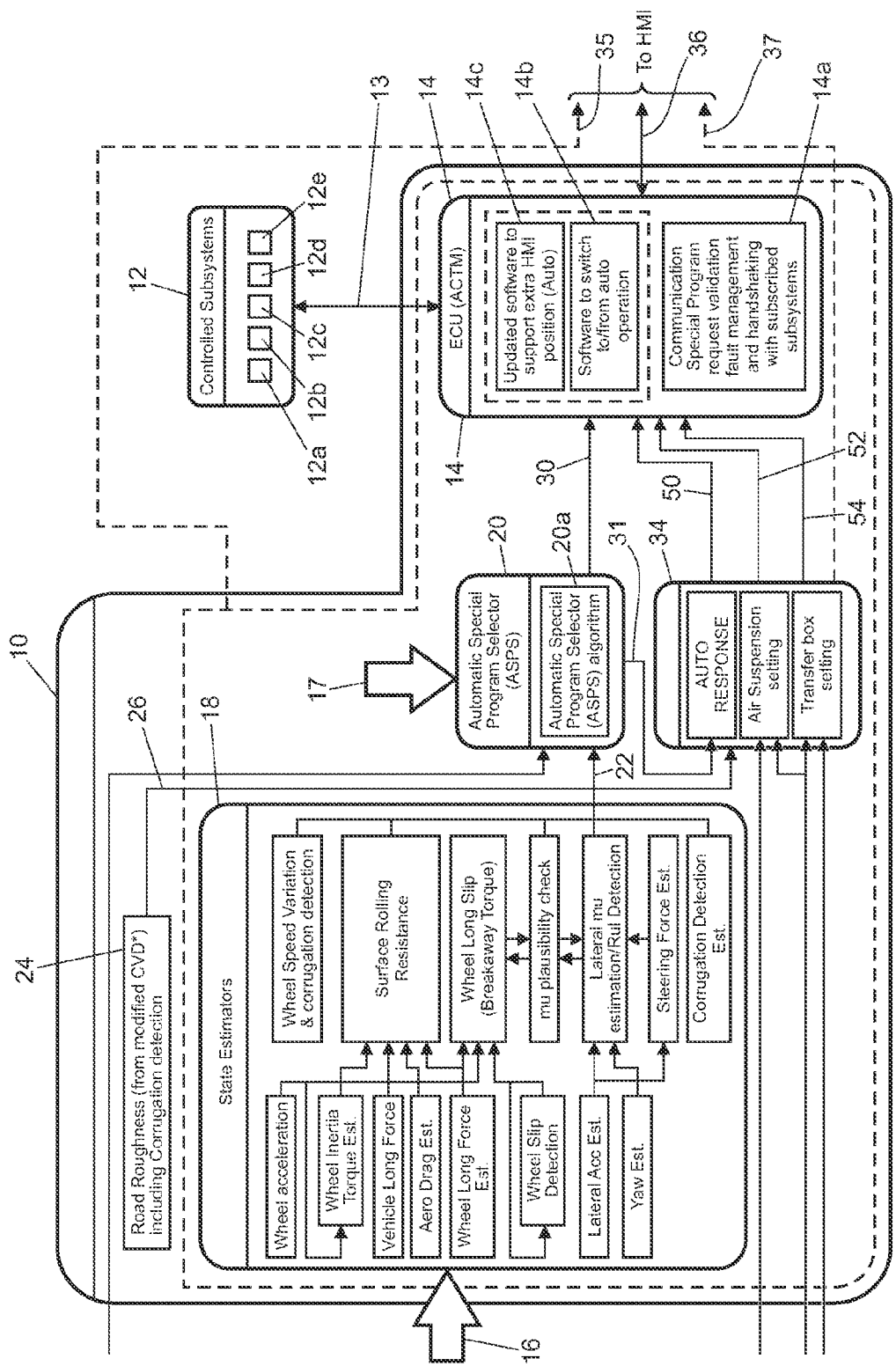
FIG. 2 is a block diagram to illustrate a vehicle control system in accordance with an embodiment of the invention, including various vehicle subsystems under the control of the vehicle control system.

FIG. 2 shows the VCU 10 in more detail. The VCU 10 controls a plurality of vehicle subsystems 12 including, but not limited to, an engine management system 12a, a transmission system 12b, an electronic power assisted steering unit 12c (ePAS unit), a brakes system 12d and a suspension system 12e. Although five subsystems are illustrated as being under the control of the VCU 10, in practice a greater number of vehicle subsystems may be included on the vehicle and may be under the control of the VCU 10. The VCU 10 includes a subsystem control module 14 which provides control signals via line 13 to each of the vehicle subsystems 12 to initiate control of the subsystems in a manner appropriate to the driving condition, such as the terrain, in which the vehicle is travelling (referred to as the terrain condition). The subsystems 12 also communicate with the subsystems control module 14 via signal line 13 to feed-back information on subsystem status.

The VCU 10 receives a plurality of signals, represented generally at 16 and 17, which are received from a plurality of vehicle sensors and are representative of a variety of different parameters associated with vehicle motion and status. As described in further detail below, the signals 16, 17 provide, or are used to calculate, a plurality of driving condition indicators (also referred to as terrain indicators) which are indicative of the nature of the condition in which the vehicle is travelling. One advantageous feature of the invention is that the VCU 10 determines the most appropriate control mode for the various subsystems on the basis of the terrain indicators, and automatically controls the subsystems accordingly.

The sensors (not shown) on the vehicle include, but are not limited to, sensors which provide continuous sensor outputs 16 to the VCU 10, including wheel speed sensors, an ambient temperature sensor, an atmospheric pressure sensor, tyre pressure sensors, yaw sensors to detect yaw, roll and pitch of the vehicle, a vehicle speed sensor, a longitudinal acceleration sensor, an engine torque sensor (or engine torque estimator), a steering angle sensor, a steering wheel speed sensor, a gradient sensor (or gradient estimator), a lateral acceleration sensor (part of a stability control system (SCS)), a brake pedal position sensor, an acceleration pedal position sensor and longitudinal, lateral, vertical motion sensors.

In other embodiments, only a selection of the aforementioned sensors may be used. The VCU 10 also receives a signal from the electronic power assisted steering unit (ePAS unit 12c) of the vehicle to indicate the steering force that is applied to the wheels (steering force applied by the driver combined with steering force applied by the ePAS unit 12c).

The vehicle 100 is also provided with a plurality of sensors which provide discrete sensor outputs 17 to the VCU 10, including a cruise control status signal (ON/OFF), a transfer box or PTU 13 status signal (whether the gear ratio is set to a HI range or a LO range), a Hill Descent Control (HOC) status signal (ON/OFF), a trailer connect status signal (ON/OFF), a signal to indicate that the Stability Control System (SCS) has been activated (ON/OFF), a windscreen wiper signal (ON/OFF), an air suspension status signal (HI/LO), and a Dynamic Stability Control (DSC) signal (ON/OFF).

The VCU 10 includes an evaluation means in the form of an estimator module or processor 18 and a calculation and selection means in the form of a selector module or processor 20. Initially the continuous outputs 18 from the sensors are provided to the estimator module 18 whereas the discrete signals 17 are provided to the selector module 20.

Within a first stage of the estimator module 18, various ones of the sensor outputs 16 are used to derive a number of terrain indicators. In a first stage of the estimator module 18, a vehicle speed is derived from the wheel speed sensors, wheel acceleration is derived from the wheel speed sensors, the longitudinal force on the wheels is derived from the vehicle longitudinal acceleration sensor, and the torque at which wheel slip occurs (if wheel slip occurs) is derived from the motion sensors to defect yaw, pitch and roll. Other calculations performed within the first stage of the estimator module 18 include the wheel inertia torque (the torque associated with accelerating or decelerating the rotating wheels), "continuity of progress" (the assessment of whether the vehicle is starting and stopping, for example as may be the case when the vehicle is travelling over rocky terrain), aerodynamic drag, yaw, and lateral vehicle acceleration.

The estimator module 18 also includes a second stage in which the following terrain indicators are calculated; surface rolling resistance (based on the wheel inertia torque, the longitudinal force on the vehicle, aerodynamic drag, and the longitudinal force on the wheels), the steering force on the steering wheel (based on the lateral acceleration and the output from the steering wheel sensor), the wheel longitudinal slip (based on the longitudinal force on the wheels, the wheel acceleration, SCS activity and a signal indicative of whether wheel slip has occurred), lateral friction (calculated from the measured lateral acceleration and the yaw versus the predicted lateral acceleration and yaw), and corrugation detection (high frequency, low amplitude wheel height excitement indicative of a washboard type surface).

The SCS activity signal is derived from several outputs from an SCS ECU (not shown), which contains the DSC (Dynamic Stability Control) function, the TC (Traction Control) function, ABS and HDC algorithms, indicating DSC activity, TC activity, ABS activity, brake interventions on individual wheels, and engine torque reduction requests from the SCS ECU to the engine. All these indicate a slip event has occurred and the SCS ECU has taken action to control it. The estimator module 18 also uses the outputs from the wheel speed sensors to determine a wheel speed variation and corrugation detection signal.

On the basis of the windscreen wiper signal (ON/OFF), the estimator module 18 also calculates how long the windscreen wipers have been in an ON state (i.e. a rain duration signal).

The VCU 10 also includes a mad roughness module 24 for calculating the terrain roughness based on the air suspension sensors (the ride height sensors) and the wheel accelerometers. A terrain indicator signal in the form of a roughness output signal 26 is output from the road roughness module 24.

The estimates for the wheel longitudinal slip and the lateral friction estimation are compared with one another within the estimator module 18 as a plausibility check.

Calculations for wheel speed variation and corrugation output, the surface rolling resistance estimation, the wheel longitudinal slip and the corrugation detection, together with the friction plausibility check, are output from the estimator module 18 and provide terrain indicator output signals 22, indicative of the nature of the terrain in which the vehicle is travelling, for further processing within the VCU 10.

The terrain indicator signals 22 from the estimator module 18 are provided to the selector module 20 for determining which of a plurality of vehicle subsystem control modes is most appropriate based on the indicators of the type of terrain in which the vehicle is travelling. The most appropriate control mode is determined by analysing the probability that each of the different control modes is appropriate on the basis of the terrain indicator signals 22, 26 from the estimator module 18 and the road roughness module 24.

The vehicle subsystems 12 may be controlled automatically (referred to as the "automatic mode") in response to a control output signal 30 from the selector module 20 and without the need for driver input. Alternatively, the vehicle subsystems 12 may be operated in response to a manual driver input (referred to as "manual mode") via a Human Machine interface (HMI) module 32. The subsystem controller 14 may itself control the vehicle subsystems 12a-12e directly via the signal line 13, or alternatively each subsystem may be provided with its own associated intermediate controller (not shown in FIG. 1) for providing control of the relevant subsystem 12a-12e. In the latter case the subsystem controller 14 may only control the selection of the most appropriate subsystem control mode for the subsystems 12a-12e, rather than implementing the actual control steps for the subsystems. The or each intermediate controller may in practice form an integral part of the main subsystem controller 14.

When operating in the automatic mode, the selection of the most appropriate subsystem control mode is achieved by means of a three phase process;

(1) for each type of control mode, a calculation is performed of the probability that the control mode is suitable for the terrain over which the vehicle is travelling, based on the terrain indicators;

(2) the integration of "positive differences" between the probability for the current control mode and the other control modes; and (3) the program request to the control module 14 when the integration value exceeds a pro-determined threshold or the current terrain control mode probability is zero.

The specific steps for phases (1), (2) and (3) will now be described in more detail.

In phase (1), the continuous terrain indicator signals in the form of the road surface roughness output 26 and the outputs 22 from the estimator module 18 are provided to the selector module 20. The selector module 20 also receives the discrete terrain indicators 1 directly from various sensors on the vehicle, including the transfer box status signal (whether the gear ratio is set to a HI range or a LO range), the DSC status signal, cruise control status (whether the vehicle's cruise control system is ON or OFF), and trailer connect status (whether or not a trailer is connected to the vehicle). Terrain indicator signals indicative of ambient temperature and atmospheric pressure are also provided to the selector module 20.

The selector module 20 is provided with a probability algorithm 20a for calculating the most suitable control mode for the vehicle subsystems based on the discrete terrain indicator signals 17 received directly from the sensors and the continuous terrain indicators 22, 26 calculated by the estimator module 18 and the road surface roughness module 24, respectively. That is, the probability algorithm 20a calculates the most suitable system control mode, which determines a respective subsystem configuration mode in which each subsystem is to be operated, based on the discrete terrain indicator signals 17.

The control modes typically include a grass/gravel/snow control mode (GGS mode) that is suitable for when the vehicle is travelling in grass, gravel or snow terrain, a mud/ruts control mode (MR mode) which is suitable for when the vehicle is travelling in mud and ruts terrain, a rock crawl/boulder mode (RB mode) which is suitable for when the vehicle is travelling in rock or boulder terrain, a sand mode which is suitable for when the vehicle is travelling in sand terrain (or deep soft snow) and a special programs OFF mode (SP OFF mode) which is a suitable compromise mode, or general mode, for all terrain conditions and especially vehicle travel on motorways and regular roadways. Many other control modes are also envisaged including those disclosed in US2003/0200016, the content of which is hereby incorporated by reference.

The different terrain types are grouped according to the friction of the terrain and the roughness of the terrain. For example, it is appropriate to group grass, gravel and snow together as terrains that provide a low friction, smooth surface and if is appropriate to group rock and boulder terrains together as high friction, very high roughness terrains.

FIG. 3 is a table taken from US2003/0200018 showing the particular sub-system configuration modes assumed by the subsystems 12 of the vehicle 100 in the respective different operating modes in which the VCU 10 may operate.

The operating modes are:
(a) A motorway (or highway) mode;
(b) A country road mode;
(c) A city driving (urban) mode;
(d) A towing (on-road) mode;
(e) A dirt track mode;
(f) A snow/ice (en-road) mode:
(g) A grass/gravel/snow (GGS) mode;
(h) A sand mode;
(i) A rock crawl or boulder crossing mode; and
(j) A mud/ruts mode The operating modes may in some embodiments include a sport or dynamic mode optimised for performance-oriented driving, an economy mode optimised for economy-oriented driving, and a default mode. The default mode may be an on-mad mode for general on-road driving conditions.

With reference to FIG. 3, the configuration of the suspension system 12e is specified in terms of ride height (high, standard or low) and side/side air interconnection. The suspension system 12e is a fluid suspension system, in the present embodiment an air suspension system, allowing fluid interconnection between suspensions for wheels on opposite sides of the vehicle in the manner described in US2003/0200016. The plurality of subsystem configuration modes provide different levels of said interconnection, in the present case no interconnection (interconnection closed) and at least partial interconnection (interconnection open).

The configuration of the ePAS steering unit 12c may be adjusted to provide different levels of steering assistance, wherein steering wheel 181 is easier to turn the greater the amount of steering assistance. The amount of assistance may be proportional to vehicle speed in some operating modes.

The brakes system 12d may be arranged to provide relatively high brake force for a given amount of pressure applied to the brake pedal 163 or a relatively low brake force, depending on the operating mode.

The brakes system 12d may also be arranged to allow different levels of wheel slip when an anti-lock braking system is active, (for example, relatively tow amounts on low friction ("low-mu" surfaces) and relatively large amounts on high friction surfaces, or vice versa).

An electron traction control (ETC) system may be operated in a high mu or low mu configuration, the system tolerating greater wheel slip in the low mu configuration before intervening in vehicle control compared with a high mu configuration.

A dynamic stability control system (DSC) may also be operated in a high run or low mu configuration.

The engine management system 12*a* may be operated in 'quick' or 'slow' accelerator (or throttle) pedal progression configuration modes in which an increase in engine torque as a function of accelerator pedal progression is relatively quick or slow, respectively. The rate may be dependent on speed in one or more modes such as Sand mode.

The PTU 137 may be operated in a high range (HI) subsystem configuration mode or low range (LO) subsystem configuration mode as described herein.

The transmission 124 may be operated in a "normal" mode that provides a reasonable compromise between fuel economy and driving performance, a "performance" mode which generally keeps the transmission in lower gears than in the normal mode, particularly when the driver is requesting a high level of driving torque to accelerate the vehicle, and a "manual" mode in which the control of gear changes is given completely to the driver. There is also a "snow" or "ice" mode which generally keeps the transmission in higher gears than the normal mode, in particular under acceleration from rest, to avoid loss of fraction due to wheel spin, and a "send" mode which keeps the transmission in relatively high gears at low speed to avoid excessive wheel spin. Excessive wheel spin can result in the wheels digging themselves info the sand at low speeds. However, the sand mode uses relatively low gears at higher speeds where a relatively high degree of wheel slip can be desirable to provide maximum traction. Lower gearing also helps the engine 121 to remain in an operating region where the engine speed is high and the power output is high, thereby helping to avoid the vehicle 100 becoming "hogged down" by a lack of power.

In some embodiments, a centre differential and a rear differential each include a clutch pack and are controllable to vary the degree of locking between a "fully open" and a "fully locked" state. The actual degree of locking at any one time may be controlled on the basis of a number of factors in a known manner, but the control can be adjusted so that the differentials are "more open" or "more locked". Specifically the pre-load on the clutch pack can be varied which in turn controls the locking torque, i.e. the torque across the differential that will cause the clutch, and hence the differential, to slip. A front differential could also be controlled in the same or similar way.

For each subsystem control mode, the algorithm 20*a* within the selector module 20 performs a probability calculation, based on the terrain indicators, to determine a probability that each of the different control modes is appropriate. The selector module 20 includes a tuneable data map which relates the continuous terrain indicators 22, 26 (e.g. vehicle speed, road roughness, steering angle) to a probability that a particular control mode is appropriate. Each probability value typically takes a value of between 0 and 1. So, for example, the vehicle speed calculation may return a probability of 0.7 for the RB mode if the vehicle speed is relatively slow, whereas if the vehicle speed is relatively high the probability for the RB mode will be much lower (e.g. 0.2). This is because it is much less likely that a high vehicle speed is indicative that the vehicle is travelling over a rock or boulder terrain.

In addition, for each subsystem control mode, each of the discrete terrain indicators 17 (e.g. trailer connection status ON/OFF, cruise control status ON/OFF) is also used to calculate an associated probability for each of the control modes, GGS, RB, Sand, MR or SP OFF. So, for example, if cruise control is switched on by the driver of the vehicle, the probability that the SP OFF mode is appropriate is relatively high, whereas the probability that the MR control mode is appropriate will be lower.

For each of the different sub system control modes, a combined probability value, Pb, is calculated based on the individual probabilities for that control mode, as described above, as derived from each of the continuous or discrete terrain indicators 17, 22, 26. In the following equation, for each control mode the individual probability as determined for each terrain indicator is represented by a, b, c, d . . . n. The combined probability value, Pb, for each control mode is then calculated as follows:

$$Pb=(a,b,c,d \ldots n)/(a,b,c,d \ldots n)+(1-a),(1-b),(1-c),(1-d) \ldots (1-nn))$$

Any number of individual probabilities may be input to the probability algorithm 20*a* and any one probability value input to the probability algorithm may itself be the output of a combinational probability function.

Once the combined probability value for each control mode has been calculated, the subsystem control program corresponding to the control mode with the highest probability is selected within the selector module 20 and an output signal 30 providing an indication of this is provided to the subsystem control module 14. The benefit of using a combined probability function based on multiple terrain indicators is that certain indicators may make a control mode (e.g. GGS or MR) more or less likely when combined together, compared with basing the selection on just a single terrain indicator alone.

A further control signal 31 from the selector module 20 is provided to a control module 34.

In phase (2), an integration process is implemented continually within the selector module (20) to determine whether it is necessary to change from the current control mode to one of the alternative control modes.

The first step of the integration process is to determine whether there is a positive difference between the combined probability value for each of the alternative control modes compared with the combined probability value for the current control mode.

By way of example, assume the current control mode is GGS with a combined probability value of 0.5. If a combined probability value for the sand control mode is 0.7, a positive difference is calculated between the two probabilities (be a positive difference value of 0.2). The positive difference value is integrated with respect to time. If the difference remains positive and the integrated value reaches a predetermined change threshold (referred to as the change threshold), or one of a plurality of predetermined change thresholds, the selector module 20 determines that the current terrain control mode (for GGS) is to be updated to a new, alternative control mode (in this example, the sand control mode). A control output signal 30 is then output from the selector module 20 to the subsystem control module 14 to initiate the sand control mode for the vehicle subsystems.

In phase (3), the probability difference is monitored and if, at any point during the integration process, the probability difference changes from a positive value to a negative value, the integration process is cancelled and reset to zero. Similarly, if the integrated value for one of the other alternative control modes (i.e. ether than sand), reaches the predetermined change threshold before the probability result for the sand control mode, the integration process for the sand control mode is cancelled and reset to zero and the other alternative control mode, with a higher probability difference, is selected.

Vehicle Launch Assist

The present applicant has recognised that when driving away from rest on dry, soft sand with large torque demands, the wheels of a vehicle can spin and dig into the sand. This can cause the vehicle to sink into the sand and become stuck. In some circumstances the TC function may be unable to prevent or remedy this situation. This is because all four wheels 111-115 may slip at the same rate so that no slip is detected, and therefore the TC function does not intervene and reduce powertrain torque and/or apply braking. The amount of torque that can be delivered by a powertrain 129 without excessive wheel slip occurring depends on a number of factors including tyre contact area and sand type.

Advanced TC systems may employ an accelerometer to determine vehicle speed independently of wheel speed. However even in such cases, the SCS ECU implementing the TC function takes a finite amount of time to register wheel speed and calculate vehicle speed based on a signal from the accelerometer. Wheel spin may therefore not be detected initially and by the time the TC function does intervene the wheels 111-115 may have sunk into the sand and fail to climb back to the surface.

In order to overcome this problem, the VCU 10 is operable to implement a Vehicle Launch Assist (VLA) function, which may also be referred to in some embodiments as a 'sand launch' function, particularly in embodiments in which the VLA function is only implemented when the VCU 10 is in the sand control mode. The VCU 10 implements the VLA function by adjusting parameters associated with engine management system 12a in respect of engine or powertrain torque development. In the present embodiment, the VCU 10 adjusts parameters associated with the engine management system 12a, reducing a rate of response of the powertrain 129 to torque demand and setting a limit to the maximum allowable value of powertrain torque that may be applied to the wheels 111-115. This reduces a risk of excessive wheel spin when torque is applied to one or more wheels 111-115.

In some embodiments this is achieved by applying a filter to an accelerator control signal by means of which driver torque demand is determined. The accelerator control signal may be received from an accelerator pedal 161. In vehicles having speed control functionality such as a crawl function the filter may be applied to a speed control system torque demand, or accelerator control signal generated by the speed control system. A signal from other driver assistance systems operable to control powertrain torque demand may also be subject to the biter when active, for example a signal from a queue assist system, a creep control system or the like.

In some embodiments, in addition or instead, a maximum allowable rate of increase in powertrain torque 129 may be limited to a prescribed value.

It is to be understood that the one or more constraints imposed by the VLA function are determined in dependence on one or more parameters, optionally including one or more parameters dependent on the surface on which the vehicle 100 is supported. In particular, they are determined in dependence on one or more characteristics of the contact between the vehicle 100 and the surface. The contact between the vehicle 100 and the surface may be characterised by the amount of 'purchase' (or tractive force) that the vehicle 100 may obtain without inducing excessive slip of one or more wheels. Determination of the amount of tractive force that may be applied (which may be characterised by a maximum wheel torque before slip exceeds a prescribed amount) may be made by reference to one or more selected from amongst the type of material of which the surface is composed (e.g. grass, gravel, snow, sand, rock), a coefficient of friction between the vehicle wheel and the surface ('surface mu'), tyre pressure, suspension travel, suspension articulation, gradient, status of a locking differential, selected transmission gear and selected PTU gear ratio (high or low). Other parameters are useful in addition or instead. Other arrangements are also useful.

In the present embodiment, the VCU 10 is operable to limit powertrain torque to prevent excessive wheel slip when the VLA function is active by repeatedly determining a maximum amount of torque that may be applied to each wheel before excessive wheel slip will occur, whilst the VLA function is active. The maximum amount of torque is determined by reference to the following vehicle parameters: (a) selected control mode (whether selected manually be a user or automatically by the VCU 10), (b) vehicle tyre pressure, (c) selected gear of the transmission 124 and (d) the selected range of PTU 137.

In the present embodiment, the VCU 10 determines an estimated value of the maximum amount of wheel torque that may be applied, max_tq_est. The estimated value is a mean value of wheel torque to be applied between wheels driven by the powertrain 129. In some embodiments the VCU 10 may estimate a maximum value of torque to be applied to each individual wheel that is being or is to be driven by the powertrain 129, at a given moment in time.

Figure 4:
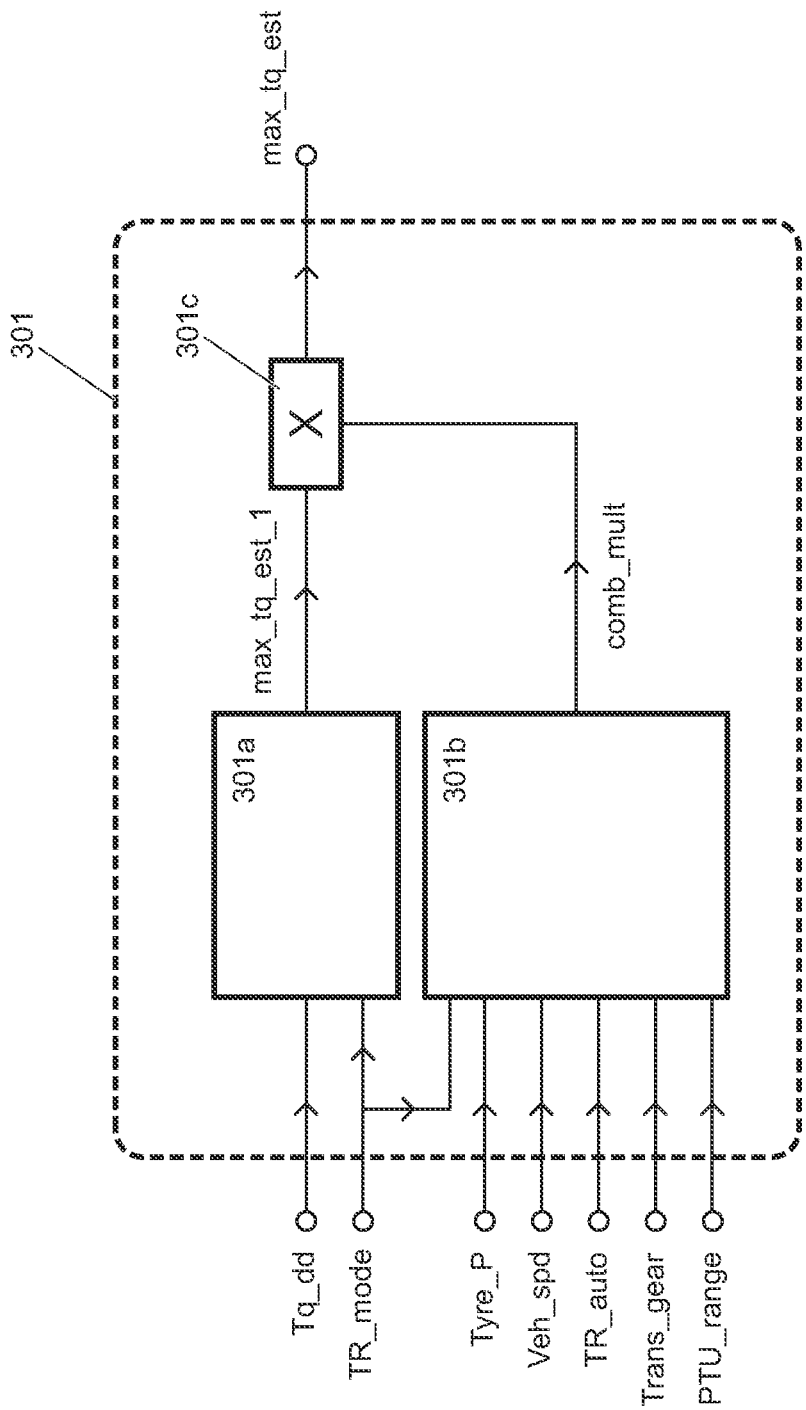
FIG. 4 is a schematic illustration of a control module of a system according to an embodiment of the invention.

FIG. 4 is a schematic illustration of a module 301 of the VCU 10 that determines the value of max_tq_est. In the present embodiment the module 301 is realised in software code run by a computing device, in the present embodiment an electronic controller.

The module 301 receives the following inputs:
(i) Unfiltered driver demanded torque, Tq_dd, determined by reference to accelerator pedal position;
(ii) Mean Tyre pressure, Tyre_P, i.e. tyre pressure averaged between road tyres of the vehicle;
(iii) Vehicle speed, Veh_spd;
(iv) Currently selected control mode (terrain response mode), TR_mode;
(v) Indication whether VCU 10 is operating in the manual or automatic control mode selection conditions, TR_auto;
(vi) Selected transmission gear, Trans_gear; and
(vii) Selected PTU range (ratio), PTU_range.

The value of Tg_dd may be a filtered value in some embodiments. The value of Tq_dd may take into account vehicle speed in addition to accelerator pedal position. One or more other parameters may be employed to calculate Tq_dd in addition or instead in some embodiments.

In some embodiments, input Tyre_may be in respect of each tyre individually, rather than a mean value across each tyre.

The value of Tq_dd together with the value of TR_ode is fed into a function block 301a which employs a look-up table (LUT) to determine a first estimate of the maximum allowable amount of wheel torque taking into account Tq_d and TR_mode, max_tq_est_1. This value is passed to a multiplier function block 301c.

The values of TR_mode, Tyre_P, Veh_spd, TR_auto, Trans_gear and PTU_range are fed info function block 301b. Function block 301b also employs look-up tables in order to calculate values of three multipliers. The multipliers are multiplied together to obtain a value comb_mult that is input to function block 301c. Function block 301c multiplies the value of max_tq_est_1 by the value of comb_mult to obtain the value of max_tq_est.

As noted above, function block 301b calculates the value of three multipliers. The multipliers are determined by three respective look-up tables. The inputs to the look-up tables are, respectively, (a) Tyre_P and TR_mode; (b) Veh_spd and TR_mode; and (c) a combination of Trans_gear and PTU_range.

The LUT in respect of Tyre_P and TR_mode enables the module 301 to adjust the value of max_tq_est according to tyre pressure in a given TR mode. The value of Tyre_P influences the area of contact between a tyre and a surface over which the vehicle 100 is driving. It is to be understood that the amount of wheel torque that can be applied before a prescribed amount of slip is exceeded can vary to a greater of lesser extent with contact area (and therefore Tyre_P) in dependence on the driving surface.

For example, reduced values of Tyre_P can increase the value of maximum wheel torque on sand, whilst on a dry grass surface the value of maximum wheel torque may be substantially independent of Tyre_P. The value of TR_mode provides an indication of the nature of the driving surface (whether sand or grass, tor example) and provides a useful input for the calculation of a multiplier (multiplication factor) for taking info account the combined effects of Tyre_P and different driving surfaces on max_tq_est.

The LUT in respect of Veh_spd and TR_mode enables the module 301 to adjust the value of max_tq_est according to vehicle speed in a manner that is dependent on the terrain over which the vehicle 100 is driving. It is to be understood that the maximum allowable wheel slip value may be permitted to increase substantially with increasing speed in certain control modes once the vehicle 100 has started moving, whilst in other control modes it may not be permitted to increase substantially due to a risk of causing surface damage.

The use of Trans_gear and PTU_range enables wheel torque to be estimated for a given value of powertrain torque. It is to be understood that in the present embodiment the value of powertrain torque is taken to be the amount of torque at an input shaft of the transmission 124. Other definitions of powertrain torque are also useful.

It is to be understood that, in some embodiments, an estimate of surface mu may be input to the module 301 in addition to or instead of the identity of the control mode in which the VCU 10 is operating, TR_mode. TR_mode otherwise provides a useful indication of the prevailing surface mu value.

In the embodiment shown the module 301 also receives an input in respect of TR_auto. In the present embodiment this input is not employed by the module 301 to calculate max_tq_est. That is, max_tq_est is independent of whether the current control mode was selected by a user in the manual condition or automatically by the VCU 10. In some alternative embodiments, the module 301 may be configured to take the value (or status) of signal TR_auto into account when calculating max_tq_est in one or mere control modes.

In some embodiments TR_auto or a corresponding parameter may not be provided to the module 301.

In some embodiments, the module 301 may be configured to determine the value of max_tq_est in dependence at least in part on a surface gradient and/or suspension articulation so as to adjust the maximum torque estimate for front end rear wheels respectively due to redistribution of weight from uphill wheels to downhill wheels. The module 301 may reduce the estimated maximum tractive force for uphill wheels and increase the estimated maximum tractive force for downhill wheels in proportion to the gradient, the adjustment being greater the greater the gradient.

It is to be understood that the VCU 10 controls the engine management system 12a (and therefore powertrain 129) according to the value of max_tq_est. The VCU 10 limits the maximum allowable value of powertrain torque that may be developed at a given moment in time so as not to exceed the value of max_tq_est at the wheels 111-115 at a given moment in time. It is to be understood that in embodiments having front and rear driving wheels arranged to be driven by the powertrain 129, the VCU 10 may adjust a distribution of powertrain torque between the front and rear wheels 111-115 so as not to exceed at each wheel the value of max_tq_est that has been calculated.

In some embodiments a vehicle may be provided with an electric propulsion motor associated with each wheel that is driven, for example electric hub motors. In such vehicles, an amount of powertrain torque applied to each wheel individually may be controlled in a convenient and precise manner. In some such embodiments, individual tyre pressure monitoring combined with individual wheel torque control can improve vehicle performance, and can be particularly advantageous when accelerating a vehicle from rest.

It is to be understood that in the present embodiment the value of max_tq_est may vary as a function of time according to the methodology described above so as to limit the maximum allowable torque rise rate as well as the maximum allowable torque.

In some embodiments the VLA function may be implemented (triggered, or 'called') when a proscribed set of conditions are met. In the present embodiment the conditions are: 1) the vehicle speed is less than a prescribed value (5 km/h in the present embodiment although other speeds are also useful); 2) driver demanded torque or accelerator position is greater than a prescribed value; and 3) the VCU 10 is operating in the Sand mode or the GGS mode. Condition (3) may alternatively allow the VLA function to be implemented when the VCU 10 is operating in one or more other control modes in addition or instead.

In some alternative embodiments, requirement (3) may be that the VCU 10 is operating in the Sand mode in the manual control mode selection condition. Thus, the status of signal Auto_TR may be taken into account in determining whether the VLA function is to be implemented.

In some embodiments the VLA function is always active, the function being arranged to apply different forms of response of the powertrain 129 to torque demand and different powertrain torque limits depending on whether the conditions described above are met Other conditions are also useful in addition or instead. The VLA function may be effectively disabled by setting torque limits that are relatively high when a control mode has been selected for which the VLA function is not required to limit powertrain torque. Thus in the present embodiment the VLA function may be effectively disabled when operating in a control mode other than Sand or GGS. In the alternative embodiment described above in which the VLA function is only active when the Sand mode has been manually selected, the VLA function may be effectively disabled by setting torque limits that are relatively high when the VCU 10 is not operating in both the Sand mode and the manual control mode selection condition.

As described above, the actual response; of the powertrain 129 to torque demand that is permitted by the VLA function and the powertrain torque limit that is imposed may depend on one or more parameters. In the present embodiment the response and torque limit depend at least in part on the selected gear of the transmission 124 and whether the PTU is in the low ratio range or high ratio range as described above.

It is to be understood that the value of vehicle speed repaired under condition 1) may correspond to the value below which a TC function or the like is unable to intervene and prevent or reduce excessive wheel slip. This value may be referred to as TC_min_spd. Such a function may be inactive below that speed due for example to an inability of the system to measure vehicle and/or wheel speed accurately below that speed. This may be due for example to lack of availability of a sufficiently accurate wheel speed sensor. The value of TC_min_spd may be set to a value of around 5 kph. Other values are also useful.

If any of conditions 1) to 3) are not met, in the present embodiment the VLA function does not reduce the rate of response of the powertrain 129 to torque demand or apply a limit to the amount of torque that may be applied by the powertrain 129.

As described above, in some embodiments condition 3) may include one or mom other control modes in addition or instead. One or more characteristics of the VLA function that is implemented may depend on the selected control mode as also discussed above.

In some embodiments, a primary VLA function is implemented when conditions 1) to 3) are met. If all of the conditions are met except for condition 3) and the VCU 10 is in automatic mode (whereby the most appropriate control mode is selected automatically) a secondary VLA function may be implemented instead when the prescribed one or mere modes (such as sand, or sand or GGS) has been selected automatically, in some embodiments the secondary VLA function differs from the primary VLA function in that a less severe limitation or limitations are placed en vehicle response when a demand for an increase in powertrain torque is made. In some embodiments, the amount by which the rate of response of the powertrain 129 to torque demand is limited is reduced relative to that in the case of the primary VLA function. That is, the reduction in powertrain torque demand imposed is not as severe as that imposed by the primary VLA function.

In the embodiment described with respect to FIG. 4, the look-up tables employed by the module 301 may be arranged to generate less severe modifiers of the value of max_tq_est when the VCU is in the automatic control mode selection condition (automatic mode).

In some embodiments, when the VCU 10 is operating in automatic mode and the VCU 10 has selected the Sand mode, the VCU 10 may be configured to allow the primary VLA function to be implemented only if one or more conditions are met that are in addition to conditions 1 and 2 listed above, i.e. in addition to the requirement that vehicle speed is less than a prescribed value and driver demanded torque or accelerator position is greater than a prescribed value. The further one or mere conditions may be conditions that allow further confirmation to be obtained that the vehicle 100 is operating on sand. In the absence of such confirmation, the secondary VLA function may be implemented. The conditions may include the condition that a particular terrain indicator is providing a particular indication consistent with the vehicle operating on sand. In some embodiments a user may be prompted to provide positive confirmation the vehicle is operating on sand, for example by actuating a multifunction input device such as a control button, a dedicated input device, touching a touch screen display, speaking a voice command, or any other suitable confirmation.

In embodiments in which the VLA-function may be implemented when operating in one or more control modes, optionally on sand, the VCU 10 may be configured to request that a driver provide confirmation that they agree to the VLA function being 'active' or triggered or called.

In embodiments having only a primary VLA function and not a secondary VLA function, the VCU 10 may be configured to allow the primary VLA function to be implemented if the further confirmation of operation on sand is obtained.

It is to be understood that the VLA function (and secondary VLA function where one is provided) may be arranged to cancel operation when vehicle speed exceeds a prescribed value. Once vehicle speed exceeds the prescribed value the VCU 10 may be configured to blend the powertrain torque demand limitation applied by the VLA function with that demanded by the user (the amount demanded by the user typically being higher because it will typically exceed max_tq_est). Thus in embodiments in which a rate of increase in powertrain torque is limited to max_tq_est being a value less than that demanded by the driver, the VCU 10 may be arranged to blend the value of max_tq_est with that demanded by the user once vehicle speed exceeds the prescribed value.

Similarly, in embodiments arranged to limit the maximum allowable powertrain torque, the VCU 10 may be arranged to blend the maximum value of powertrain torque allowed by the VLA function with that demanded by a user once vehicle speed exceeds the prescribed value. Thus, the amount of torque provided is increased gradually until it matches that demanded by the user.

Figure 5:
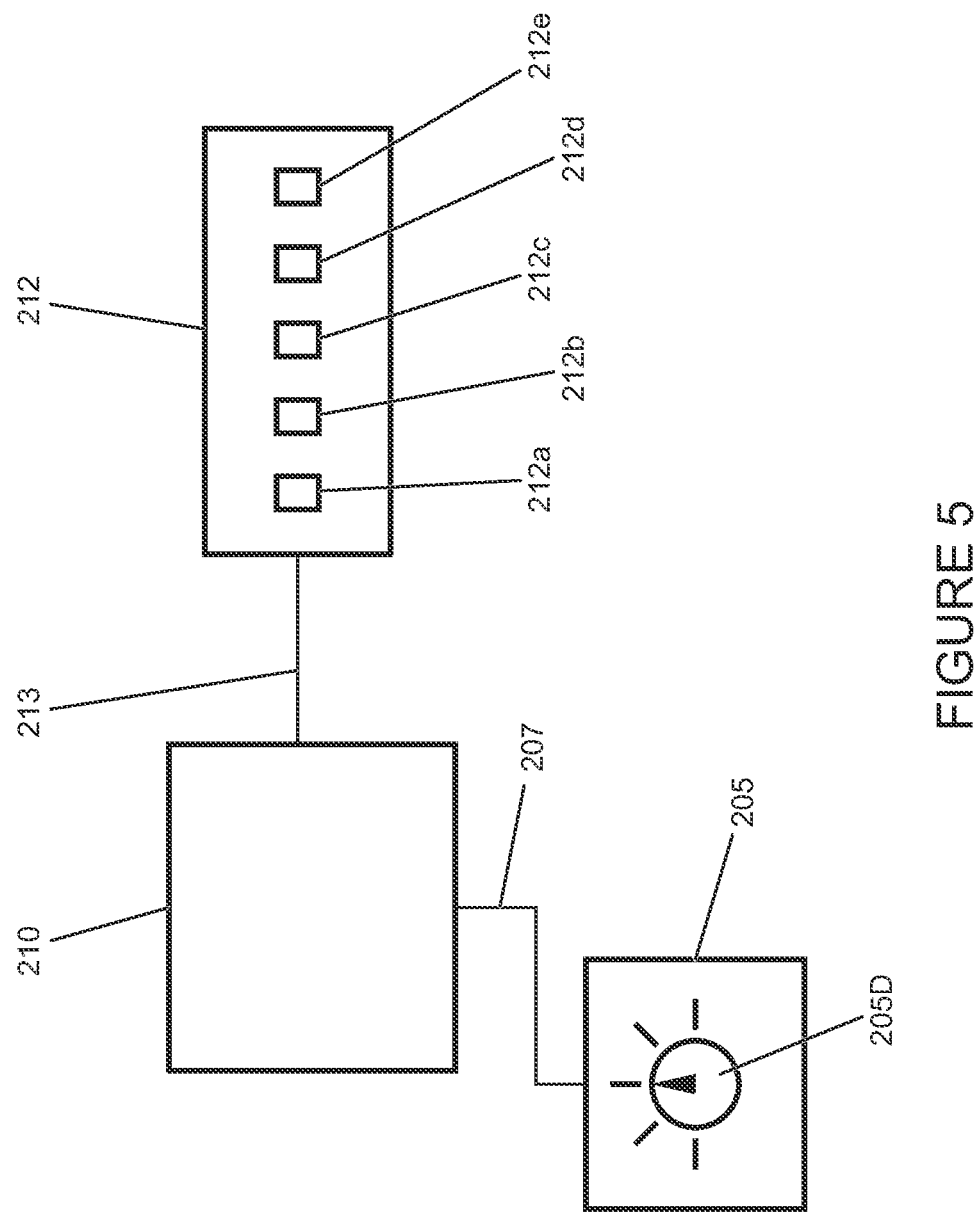
FIG. 5 is a block diagram to illustrate a vehicle control system in accordance with a further embodiment of the invention, including various vehicle subsystems under the control of the vehicle control system.

FIG. 5 shows a VCU 210 according to a further embodiment of the invention. The VCU 210 differs from the VCU 10 of FIG. 2 in that it is operable in a manual mode only and not an automatic mode. That is, the VCU 210 is not capable of determining the most appropriate control mode in which subsystems 212 of a vehicle should be operated.

The VCU 210 is arranged to receive a control input via signal line 207 from a manual selector module 205. Selector module 200 has a rotatable dial 205D by means of which a user may select a control mode in which the subsystems 212 are to be operated. The selectable control modes correspond to those described above with respect to the embodiment of FIG. 2 and include a grass/gravel/snow control mode (GGS mode), a mud/ruts control mode (MR mode), a rock crawl/boulder mode (RB mode), a sand mode and a special programs OFF mode (SP OFF mode).

The VCU 210 is configured to control the vehicle subsystems 212 to operate in the control mode selected by the selector module 205. The VCU 210 controls each subsystem to operate in one of a plurality of available subsystem configuration modes, the selected subsystem configuration mode for each subsystem being selected in dependence on the selected control mode.

In the embodiment of FIG. 5 the VCU 210 is operable to activate a VLA function under certain conditions. These conditions are: 1) the vehicle speed is less than a prescribed value (5 km/h in the present embodiment although other speeds are also useful); 2) driver demanded torque or accelerator position is greater than a prescribed value; and 3) the user has manually selected the Sand control mode.

In some embodiments the VLA function is always active, the function being arranged to apply different forms of response of the powertrain to torque demand and different powertrain torque limits depending on whether the conditions described above are met. Other conditions are also useful in addition or instead. The VLA function may be effectively disabled by setting torque limits that are relatively high when the user has not manually selected the Sand mode.

As described with respect to the previous embodiment, it is to be understood that the value of vehicle speed required under condition 1) may correspond to the value below which a TC function or the like is unable to intervene and prevent or reduce excessive wheel slip. Such a function may be inactive below that speed due for example to an inability of the system to measure vehicle and/or wheel speed accurately below that speed. This may be due for example to lack of availability of a sufficiently accurate wheel speed sensor.

If any of conditions 1 to 3 are not met, in the present embodiment the VLA function does not reduce the rate of response of the powertrain 129 to torque demand or apply a limit to the amount of torque that may be applied by the powertrain 129.

In some embodiments condition 3) may include one or more other control modes in addition of instead. One or more characteristics of the VLA function that is implemented may depend on the selected control mode.

As in the case of the embodiment of FIG. 2, in the embodiment of FIG. 5 the VCU 210 is operable to determine the one or more constraints that are to be imposed by the VLA function in dependence on the surface on which the vehicle is supported. In particular, the one or more constraints are determined in dependence on one or more characteristics of the contact between the vehicle 100 and the surface.

As noted above, the contact between the vehicle 100 and the surface may be characterised by the amount of 'purchase' (or tractive force) that the vehicle 100 may obtain without inducing excessive slip of one or more wheels. Determination of the amount of tractive force that may be applied may be made by reference to one or more selected from amongst the type of material of which the surface is composed (e.g. grass, gravel, snow, sand, rock), a coefficient of friction between the vehicle wheel and the surface, tyre pressure, suspension travel, suspension articulation, gradient, status of a locking differential, selected transmission gear and selected PTU gear ratio (high or low). Other parameters are useful in addition or instead. Other arrangements are also useful.

Embodiments of the present invention have the advantage that when the VLA system is activated, it is activated in an intelligent manner whereby the one or more constraints imposed thereby are tailored to the ability of a vehicle to generate tractive force between wheel and terrain. It is to be understood that because the constraints are determined in response to indications in respect of an actual tractive force obtainable, the magnitude of the one or mere constraints imposed are not too great and not too small. This is in contrast to a system in which a blanket constraint is applied whenever a given subsystem control mode is selected, regardless of the actual amount of tractive force obtainable.

Throughout the description and claims of this specification, the words "comprise" and "contain" and variations of the words, for example "comprising" and "comprises", means "including but not limited to", and is not intended to (and does not) exclude other moieties, additives, components, integers or steps.

Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith.

The invention claimed is:

1. A vehicle control system for at least one vehicle subsystem of a vehicle, the system comprising one or more electronic controllers programmed to be operable to:
   detect an occurrence of a wheel slip event at one or more wheels of the vehicle and reduce an amount of wheel slip via a vehicle slip control process when the vehicle is travelling at a speed that is above a threshold speed, the threshold speed being a speed below which the vehicle slip control process is not permitted to intervene to reduce wheel slip; and
   prevent excessive wheel slip via a vehicle launch assist (VLA) process when the vehicle is travelling below the threshold speed below which the vehicle slip control process is not permitted to take action to reduce slip, wherein when the launch assist process is active, the one or more electronic controllers impose a set of one or more prescribed constraints on an amount of torque applied to the one or more wheels of the vehicle,
   wherein the set of one or more constraints are determined by reference to information or data in respect of the amount of wheel torque that is applied before the amount of wheel slip exceeds a prescribed value,
   and further wherein the vehicle slip control process and the vehicle launch assist process are separate and distinct processes.

2. The system according to claim 1 wherein said information or data comprises tire pressure data.

3. The system according to claim 1 wherein the information or data in respect of the amount of wheel torque that can be is applied before the amount of wheel slip exceeds a prescribed value comprises information or data pertaining to a capacity of terrain in contact with a tire to provide traction to the vehicle.

4. The system according to claim 1 wherein the set of one or more constraints include at least one selected from amongst a reduction in a rate of response of a powertrain to an increase in driver demanded torque, a reduction in a maximum allowable rate of increase of powertrain torque and a reduction in a maximum allowable value of powertrain torque.

5. The system according to claim 1 comprising a subsystem controller for initiating control of a plurality of vehicle subsystems in a selected one of a plurality of subsystem control modes, each of which corresponds to one or more different driving conditions for the vehicle, the system being configured to allow the VLA process to be activated only when at least one of a first set of one or more subsystem control modes is selected.

6. The system according to claim 5 operable in a manual operating mode selection condition in which a user selects a required system control mode by means of user-operable mode selection input device, and operable in an automatic mode selection condition in which the system is configured to select automatically an appropriate system operating mode.

7. The system according to claim 5 wherein the control modes are control modes of at least two vehicle subsystems selected from amongst a powertrain, a transmission system, a steering system, a brakes system and a suspension system and wherein operating modes include control modes selected from one or more of:
- a suspension system and the plurality of subsystem configuration modes comprise a plurality of ride heights;
- a fluid suspension system in which fluid interconnection is made between suspensions for wheels on opposite sides of the vehicle, and wherein said plurality of subsystem configuration modes provide different levels of said interconnection;
- a steering system which provides steering assistance, and wherein said plurality of subsystem configuration modes provide different levels of said steering assistance;
- a brakes system which provides braking assistance, and said plurality of subsystem configuration modes provide different levels of said braking assistance;
- a brake control system which provides an anti-lock function to control wheel slip, and said plurality of subsystem configuration modes allow different levels of said wheel slip;
- a traction control system which is arranged to control wheel spin, and said plurality of subsystem configuration modes allow different levels of said wheel spin;
- a yaw control system which is arranged to control vehicle yaw, and said plurality of subsystem configuration modes allow different levels of divergence of said vehicle yaw from an expected yaw;
- a range change transmission and said subsystem configuration modes include a high range mode and a low range mode of said transmission;
- a powertrain which includes a powertrain controller and an accelerator or throttle pedal, the subsystem configuration modes providing different levels of responsiveness of the powertrain controller to movement of the accelerator or throttle pedal; and
- a transmission system operable in a plurality of transmission ratios and including a transmission controller arranged to monitor at least one parameter of the vehicle and to select the transmission ratios in response, and wherein the subsystem configuration modes include a plurality of transmission configuration modes in which the transmission ratios are selected differently in response to said at least one parameter.

8. The system according to claim 5 wherein the first set of one or more subsystem control modes includes a sand mode in which the subsystems are controlled for driving on sand.

9. The system according to claim 8 wherein at least one of the subsystems is arranged, in the sand mode, to allow only wheel spin below a predetermined value when the vehicle is traveling at low speeds so as to avoid vehicle wheels becoming submerged in sand, but to allow wheel spin above the predetermined value when the vehicle is traveling at higher speeds.

10. The system according to claim 6, wherein the one or more electronic controllers allows the VLA process to be activated, and thereby impose the first set of one or more prescribed constraints, only when the system is operating in the manual mode selection condition.

11. The system according to claim 8 wherein, in the sand mode, a powertrain is arranged to provide drive torque below a predetermined value for a given accelerator or throttle control position at low vehicle speeds and to provide drive torque above the predetermined value for a given accelerator or throttle control position at higher vehicle speeds.

12. The system according to claim 1 wherein the information or data in respect of the amount of wheel torque that is applied before the amount of wheel slip exceeds the prescribed value is determined at least in part according to information or data in respect of at least one selected from amongst a terrain on which a vehicle is supported, a deformability of a surface on which a vehicle is supported, a size of an area of contact between a surface and one or more wheels of the vehicle, a coefficient of surface friction between one or more wheels and a surface, tire pressure, suspension travel, suspension articulation, gradient, status of a locking differential, selected gear and selected power transfer unit gear ratio.

13. The system as claimed in claim 1 wherein the prescribed value of wheel slip is determined in dependence on one or more vehicle operating parameters, and wherein the one or more operating parameters are selected from amongst vehicle speed, wheel speed and terrain over which the vehicle is moving.

14. The system as claimed in claim 1 wherein the prescribed set of one or more conditions in response to which the VLA process is activated include at least one selected from amongst: vehicle speed is less than a prescribed value, driver demanded torque is greater than a prescribed value, accelerator pedal position is beyond a prescribed amount of travel, a selected transmission gear is a prescribed one or more gears and a selected power transfer unit gear ratio is a prescribed ratio.

15. The control system according to claim 1 wherein the one or more electronic controllers is operable to activate the launch assist process in dependence on a signal indicating a status of the vehicle slip control process.

16. The control system according to claim 15 wherein the one or more electronic controllers prevents the VLA process from becoming active and attempting to prevent excessive wheel slip when a signal indicates the vehicle slip control process is able to intervene to reduce slip.

17. The control system according to claim 15 wherein at least one of the one or more electronic controllers is an electronic controller of a stability control system and/or a traction control system, and wherein the vehicle slip control process is performed by the electronic controller of the stability control system and/or a traction control system.

18. A method of controlling at least one vehicle subsystem implemented by means of one or more computing devices, the method comprising:
- detecting the occurrence of a wheel slip event at one or more wheels of the vehicle and reducing an amount of wheel slip via a vehicle slip control process when the vehicle is travelling at a speed that is above a threshold speed, the threshold speed being a speed below which the vehicle slip control process is not permitted to intervene to reduce wheel slip; and
- preventing excessive wheel slip via a vehicle launch assist (VLA) process when the vehicle is travelling below the threshold speed below which the vehicle slip control process is not permitted to take action to reduce slip, the preventing step comprising imposing a first set of one or more prescribed constraints on an amount of torque applied to the one or more wheels of a vehicle to prevent wheel slip exceeding a prescribed value,
- the method comprising determining the first set of one or more constraints by reference to information or data in respect of the amount of wheel torque that can be is applied before the amount of wheel slip exceeds a prescribed value, wherein the vehicle slip control process and the VLA process are separate and distinct processes.

19. A non-transitory computer readable storage medium carrying computer readable code for controlling a vehicle to carry out a method comprising steps of:
   detecting the occurrence of a wheel slip event at one or more wheels of the vehicle and reducing an amount of wheel slip via a vehicle slip control process when the vehicle is travelling at a speed that is above a threshold speed, the threshold speed being a speed below which the vehicle slip control process is not permitted to intervene to reduce wheel slip; and
   preventing excessive wheel slip via a vehicle launch assist (VLA) process when the vehicle is travelling below the threshold speed below which the vehicle slip control process is not permitted to take action to reduce slip, the preventing step comprising imposing a first set of one or more prescribed constraints on an amount of torque applied to the one or more wheels of a vehicle to prevent wheel slip exceeding a prescribed value,
   the method comprising determining the first set of one or more constraints by reference to information or data in respect of the amount of wheel torque that is applied before the amount of wheel slip exceeds a prescribed value,
   wherein the vehicle slip control process and the VLA process are separate and distinct processes.

20. A vehicle comprising a vehicle control system for at least one subsystem of the vehicle, the system comprising one or more electronic controllers programmed to be operable to:
   detect an occurrence of a wheel slip event at one or more wheels of the vehicle and reduce an amount of wheel slip via a vehicle slip control process when the vehicle is travelling at a speed that is above a threshold speed, the threshold speed being a speed below which the vehicle slip control process is not permitted to intervene to reduce wheel slip; and
   prevent excessive wheel slip via a vehicle launch assist (VLA) process when the vehicle is travelling below the threshold speed below which the vehicle slip control process is not permitted to take action to reduce slip,
   wherein when the launch assist process is active, the one or more electronic controllers impose a set of one or more prescribed constraints on an amount of torque applied to the one or more wheels of the vehicle,
   wherein the set of one or more constraints are determined by reference to information or data in respect of the amount of wheel torque that is applied before the amount of wheel slip exceeds a prescribed value,
   and further wherein the vehicle slip control process and the vehicle launch assist process are separate and distinct processes.

21. A vehicle, comprising:
   a first electronic controller programmed to be operable to detect the occurrence of a wheel slip event at one or more wheels of the vehicle and to reduce an amount of wheel slip via a vehicle slip control process when the vehicle is travelling at a speed that is above a threshold speed, the threshold speed being a speed below which the vehicle slip control process is not permitted to intervene to reduce wheel slip; and
   a second electronic controller different than said first electronic controller and programmed to be operable to prevent excessive wheel slip via a vehicle launch assist (VLA) process when the vehicle is travelling below the threshold speed such that the vehicle slip control process is not permitted to intervene to reduce wheel slip and thus the VLA process is configured to reduce wheel slip independent of the vehicle slip control process,
   wherein when the VLA process is active, the controller is configured to impose a set of one or more prescribed constraints on an amount of torque applied to the one or more wheels of the vehicle, the set of one or more constraints being determined by reference to information or data in respect of the amount of wheel torque that is applied before the amount of wheel slip exceeds a prescribed value,
   and further wherein the vehicle slip control process and the vehicle launch assist process are separate and distinct processes.

* * * * *